United States Patent
Choi et al.

(10) Patent No.: US 7,255,723 B2
(45) Date of Patent: Aug. 14, 2007

(54) CREST SUPPORTED FILTER FRAME ASSEMBLY AND METHOD

(75) Inventors: Kyung-Ju Choi, Jefferson County, KY (US); Dennis R. Porter, Dallas County, TX (US); Ronald D. Unthank, Jefferson County, KY (US)

(73) Assignee: AAF McQuay, Inc., Louisville, KY (US)

( * ) Notice: Subject to any disclaimer, the term of this patent is extended or adjusted under 35 U.S.C. 154(b) by 193 days.

(21) Appl. No.: 10/754,379

(22) Filed: Jan. 9, 2004

(65) Prior Publication Data

US 2005/0150201 A1 Jul. 14, 2005

(51) Int. Cl.
*B01D 46/10* (2006.01)
*B01D 46/52* (2006.01)
*B01D 39/16* (2006.01)

(52) U.S. Cl. .......................... 55/499; 55/497; 55/500; 55/501; 55/511; 55/521; 55/524; 55/528; 55/DIG. 31

(58) Field of Classification Search ............... 55/385.1, 55/495, 497, 499, 500, 501, 511, 521, 527, 55/528, DIG. 31, 524
See application file for complete search history.

(56) References Cited

U.S. PATENT DOCUMENTS

| | | | |
|---|---|---|---|
| 3,234,717 A | 2/1966 | Korn | |
| 3,692,184 A * | 9/1972 | Miller et al. ................... | 55/499 |
| 3,853,529 A * | 12/1974 | Boothe et al. ................. | 55/499 |
| 4,353,723 A * | 10/1982 | Schulz et al. ................. | 55/521 |
| 4,765,812 A * | 8/1988 | Homonoff et al. ............. | 55/528 |
| 5,098,767 A | 3/1992 | Linnersten .................. | 428/182 |
| 5,167,740 A | 12/1992 | Michaelis et al. ......... | 156/73.1 |
| 5,480,464 A * | 1/1996 | De Villiers et al. ........... | 55/320 |
| 5,618,324 A * | 4/1997 | Sommer et al. ............... | 55/497 |
| 5,782,944 A | 7/1998 | Justice ........................ | 55/49.5 |
| 5,820,645 A | 10/1998 | Murphy, Jr. ............... | 55/385.3 |
| 5,965,091 A * | 10/1999 | Navarre et al. ............... | 55/524 |
| 6,074,450 A | 6/2000 | Raber .......................... | 55/497 |
| 6,159,318 A | 12/2000 | Choi ......................... | 156/167 |
| 6,165,244 A * | 12/2000 | Choi ........................... | 55/527 |
| 6,230,776 B1 | 5/2001 | Choi .......................... | 156/441 |
| 6,254,653 B1 | 7/2001 | Choi ........................... | 55/497 |
| 6,258,143 B1 * | 7/2001 | Carawan et al. .............. | 55/499 |
| 6,322,615 B1 * | 11/2001 | Chapman ..................... | 55/521 |
| 6,398,839 B2 | 6/2002 | Choi ........................... | 55/499 |
| 6,521,011 B1 * | 2/2003 | Sundet et al. ................. | 55/499 |
| 6,709,480 B2 | 3/2004 | Sundet et al. | |
| 2001/0020512 A1 | 9/2001 | Heilmann et al. | |
| 2003/0089091 A1 | 5/2003 | Sundet et al. | |

(Continued)

FOREIGN PATENT DOCUMENTS

DE 4314563.9 5/1993

(Continued)

*Primary Examiner*—Jason M. Greene
(74) *Attorney, Agent, or Firm*—Steven A. Witters; Middleton Reutlinger

(57) ABSTRACT

A fluid pleated filter assembly arrangement including a method and structure wherein crests of the pleated medium are sharp and narrow being enhanced by alignment of the fibers with the direction of fluid stream flow with the crests being supported by a preselectively controlled breadth and thickness support strip and adhesive fastening band disposed intermediate opposed side edges of the support strip.

8 Claims, 2 Drawing Sheets

U.S. PATENT DOCUMENTS

2003/0167742 A1* 9/2003 Kahlbaugh et al. ........... 55/521

FOREIGN PATENT DOCUMENTS

| DE | 43 23 136 A1 | 1/1995 |
| EP | 1 275 428 A | 1/2003 |
| EP | 1275428 B1 | 1/2003 |
| GB | 1 236 093 A | 6/1971 |

* cited by examiner

CREST SUPPORTED FILTER FRAME ASSEMBLY AND METHOD

BACKGROUND OF THE INVENTION

The present invention relates to a unique and novel product and a unified method of making the same and more particularly to a crest supported filter frame assembly and a series of unified steps in the method of manufacturing the novel crest supported filter frame assembly. The present invention has particular utility in the filtration of fluid filters and more specifically in the filtration of air streams.

Recent U.S. Pat. No. 6,230,776, issued to Kyung-Ju Choi on May 15, 2001 discloses a unit pleated filter frame assembly (FIGS. 5 and 6) with the pleat crests thereof adhesively fastened to flexible tape strips 36 and with stiffening strips 38 being fastened to strips 38. In fact, FIG. 3 of prior U.S. Pat. No. 5,098,767, issued to S. B. Linnersten on Mar. 24, 1992 broadly teaches the use of strips "S" of hot melt adhesive applied to successive filter micropleats to hold such pleats in position when the filter is in use.

Further, a number of still earlier patents disclose various structural arrangements for supporting filter medium pleats—attention being directed to FIG. 2 of U.S. Pat. No. 5,167,740, issued to U. Michaelis, et al on Dec. 1, 1992; to FIG. 1 of U.S. Pat. No. 5,782,944, issued to T. A. Justice on Jul. 21, 1998; to FIG. 1 of U.S. Pat. No. 6,074,450, issued to R. R. Raber on Jun. 13, 2000; and, to the several unit pleated filter arrangements disclosed in the Kyung-Ju Choi and Choi, et al U.S. Pat. No. 6,159,318, issued Dec. 12, 2000; U.S. Pat. No. 6,254,653, issued Jul. 3, 2001; and, U.S. Pat. No. 6,398,839, issued Jun. 4, 2002.

In addition to these several aforenoted prior art unit filter assemblies, attention is directed to U.S. Pat. No. 6,165,244 issued to Kyung-Ju Choi on Dec. 26, 2000, which teaches the broad principle of filter medium fibers oriented to be aligned with the direction of fluid stream flow; and, to U.S. Pat. No. 5,820,645, issued to W. F. Murphy, Jr. on Oct. 13,1998, which broadly teaches gradient fiber density including layers of low and high denier fibers.

The present invention, recognizing some of the limitations and problems of the prior art—including the several arrangement set forth in the aforenoted patents—provides a unique and novel fluid filter assembly which includes a filter frame member and a filter medium disposed therein—the present invention further providing several unique steps which can be included as part of the several steps in the method of manufacturing the unique fluid filter assembly.

In accordance with the present invention, a novel arrangement is provided which includes a fluid filter frame assembly structure which can be efficiently and economically manufactured and assembled and which is stable and efficient in installation and operation. The present novel arrangement requires a minimum of operating parts and the novel embodiment results in a minimum of treated fluid stream interference with a minimum fluid stream pressure drop. The unique arrangement of the present invention, recognizes and resolves problems of past fluid filter assembly arrangements including fluid stream interference and fluid stream diversions accompanied by possible concomitant flaking and peeling resulting through an excess of crest fastening materials.

In this regard, the present invention optimizes utilization of a minimum fastening area, reducing the requirement for crest stabilizing materials and the manufacturing steps to be employed—at the same time, minimizing the fluid stream pressure drop during fluid treatment operations. In addition, the present invention provides a fibrous filter medium which is not only efficient in the filtration of particulate materials from a treated fluid stream such as air, but also allows for odor and some volatile organic compounds (VOC) reduction and provides for a fiber arrangement which assures the pleat folding formation of thin, narrow, and sharp upstream and downstream crest folds.

Various other features of the present invention will become obvious to one skilled in the art upon reading the disclosure set forth herein.

SUMMARY OF THE INVENTION

More particularly, the present invention provides a novel and unified filter assembly including a filter frame member and a flow-through filter medium disposed therein comprising: a border frame member and a flow-through filter medium sized to be disposed therein, the border frame member having an inner perimeter defining a flow-through passage to receive and support the filter medium, the filter medium being in the form of spaced pleats to provide spaced opposed upstream and downstream crest sets; and, at least one longitudinally extending support strip of preselectively controlled, firm support strength, breadth and thickness to include spaced opposed side edges, the support strip extending adjacent at least one of the crest sets of the filter medium in supporting relationship therewith, the support strip including a thin, preselectively controlled breadth and thickness binding band of adhesive fastening material extending between the side edges of the support strip in primarily engaging and fastening relationship to the crests of the crest set.

Further, the present invention provides for a unique and novel odor and some volatile organic compounds (VOC) removing filter media arrangement which includes selected amounts by weight of high and low denier fibers and which media is arranged for fiber alignment with accompanying sharp and narrow crest folds.

In addition, the present invention provides a unified and novel method of forming a pleated fibrous fluid filter material assembly which includes the steps of feeding fibrous filter material in pleated form from a prior pleating zone through a planar zone, the pleated fibrous filter material including spaced upstream and downstream longitudinally extending spaced crest sets; feeding at least one longitudinally extending support strip into the planar zone with one face of the support strip being of preselectively controlled breadth and thickness and adjacent at least one of the crest sets, the support strip including longitudinally extending spaced opposed side edges with opposed longitudinal faces therebetween and applying a thin, preselectively controlled breadth and thickness adhesive fastening band to one of the faces of each support strip intermediate the opposed strip side edges as the support strip enters the planar zone to fasten the support strip to the crest in supporting relation therewith to positionally maintain the crest in firm pleated form in the planar zone and during operational filtering usage.

Moreover, the present invention provides a unique pleated filter media fiber arrangement with the fibers being aligned with the treated fluid stream flow through the pleated media and extending substantially transverse or normal to the crests formed by the folding of the media so as to enhance fluid stream flow. Further, the present invention provides a unique filter media composition wherein filter media fibers by weight are comprised of selected bi-component fibers and staple fibers.

It is to be understood that various changes can be made by one skilled in the art in one or more of the several parts of the inventive filter structure frame assembly and in one or more of the several steps of the inventive method disclosed herein without departing from the scope or spirit of the present invention. For example, instead of employing a longitudinally extending thin continuous adhesive band, the band can be comprised of continuously aligned spaced, and selectively shaped adhesive segments positioned to extend along or transverse the crests of a crest set. Further, the planar zone of the method can be arranged to extend at a selected angle differing from that disclosed.

BRIEF DESCRIPTION OF THE DRAWINGS

Referring to the drawings which disclose one advantageous embodiment of the present filter frame assembly arrangement.

DETAILED DESCRIPTION OF THE INVENTION

Figure 1:
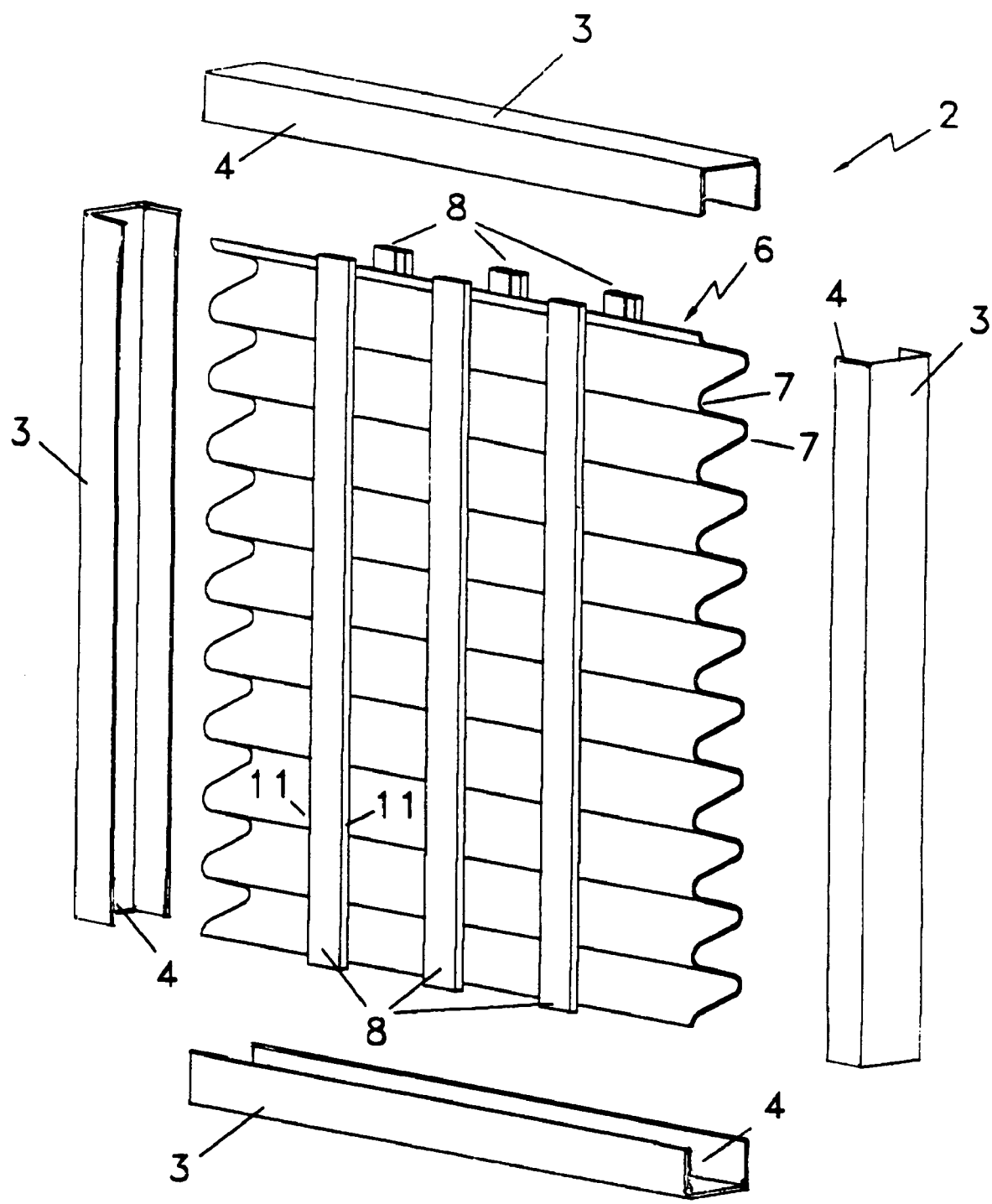
FIG. 1 is an exploded, isometric view of the several parts of the novel filter frame assembly including the border body frame member with the filter media to be disposed as a unit filter medium in the assembled frame and the adhesive band carrying support strips adjacent the crest set forming pleat folds of the media—portions of the pleated filter media being broken away to illustrate in exaggerated form the filter fiber alignment transverse the crest forming pleat folds and the longitudinally extending adhesive band on the inner face of a support strip.

Referring to the exploded isometric view of the novel filter assembly of FIG. 1, it can be seen that the novel filter assembly of FIG. 1, it can be seen that the novel filter frame assembly 2 includes a frame member—which here is shown as being of rectangular shape and which advantageously can be of a selected, pliable, firm material such as a fireproof cardboard material—it being understood that other shapes and sizes of unit filter assemblies can be utilized and that firm, pliable materials besides cardboard, plastic, wood or thin metal. Also could be utilized.

The filter frame assembly 2 can be comprised of spaced pairs of opposed frame member sides 3 of U-shaped cross-section. Sides 3 can be joined at their respective ends by some suitable means such as by stapling, adhesive, or by interfitting slot and tab arrangements, providing an inner perimeter defining flow-through passage in which a pleated, fibrous filter medium 6 is disposed, the filter medium 6 can be so sized that opposed, spaced ends or extremities thereof engage in fastened relation—such as by a suitable adhesive—with joined U-shaped frame member sides 3.

The pleated, fibrous filter medium of a unit filter assembly 2 can be formed form any one of a number of known foldable and pleatable fiber materials—including synthetic materials—and advantageously, in accordance with the present invention, can be dri-laid and be by weight approximately sixty five (65) percent (%) three (3) denier polyester fiber and approximately thirty-five (35) percent (%) six (6) denier fiber with a polyvinyl acetate binder comprising approximately forty (40) percent (%) of the fiber weight, and be by weight of approximately fifty (50) percent (%) four (4) denier bi-component fiber, approximately thirty-eight (38) percent (%) two point two five (2.25) denier polyester fiber and twelve (12) percent (%) fifteen (15) denier fiber, and be by weight of approximately sixty (60) percent (%) four (4) denier bi-component fiber, approximately twenty (20) percent (%) six (6) denier polyester fiber and twenty (20) percent (%) one (1) denier fiber. The pleats of the pleated fibrous filter medium 6 serve to provide sets of spaced upstream and downstream spaced pleat crest sets 7.

As can be seen in one of the broken-away portions "A" of FIG. 1 of the drawings, the fibers of filter medium 6 are disclosed as being aligned to extend approximately transversely normal to spaced pleat narrowly folded, sharp crests 7 and to be in alignment with the direction of fluid stream flow through the passage defined by border frame perimeter 4. It also is to be noted that the aligned fibers of fibrous filter medium 6 can be treated with a suitable odor and some volatile organic compounds (VOC) removal material such as activated silica-alumina.

In a typical frame assembly 2, the pleated crests of fibrous filter medium 6, advantageously can be of three fourth (¾) inch normal depth with a count of approximately fourteen (14) and twelve (12) spaced pleats per twelve (12) inches. In accordance with a principle feature of the present invention, crest support strips 8 of preselectively controlled breadth and thickness, three of which can be seen in spaced relation in FIG. 1 of the drawings—can be arranged to extend transversely across the crests of crest sets 7 with the opposed ends or extremities of strips 8 being fastened by some suitable means such as adhesives to spaced opposed border frame sides 3 of frame assembly 2.

Each of support strips 8 includes spaced opposed side edges 11 and—as can be seen in broken away portion "B" of FIG. 1—located intermediate spaced opposed side edges 11 of each support strip 8—advantageously centrally—is a thin, longitudinally extending binding band 13. Binding band 13—which is of preselectively controlled breadth and thickness can be of adhesive material—serves to engage in support strip fastening relation with folded pleat crests 7. Advantageously, support strips 8 can be formed from the same material as border frame member sides 3 of frame assembly 2 with each support strip 8 being of a breadth in the range of zero point two (0.2) inch (") to one point five (1.5) inch (") and advantageously zero point six two five (0.625) inches ("), and each binding band 13 being of a breadth of in the range of zero point zero three (0.03) inch (") to zero point two (0.2) inch (") and advantageously zero point zero nine (0.09) inches (").

Figure 2:
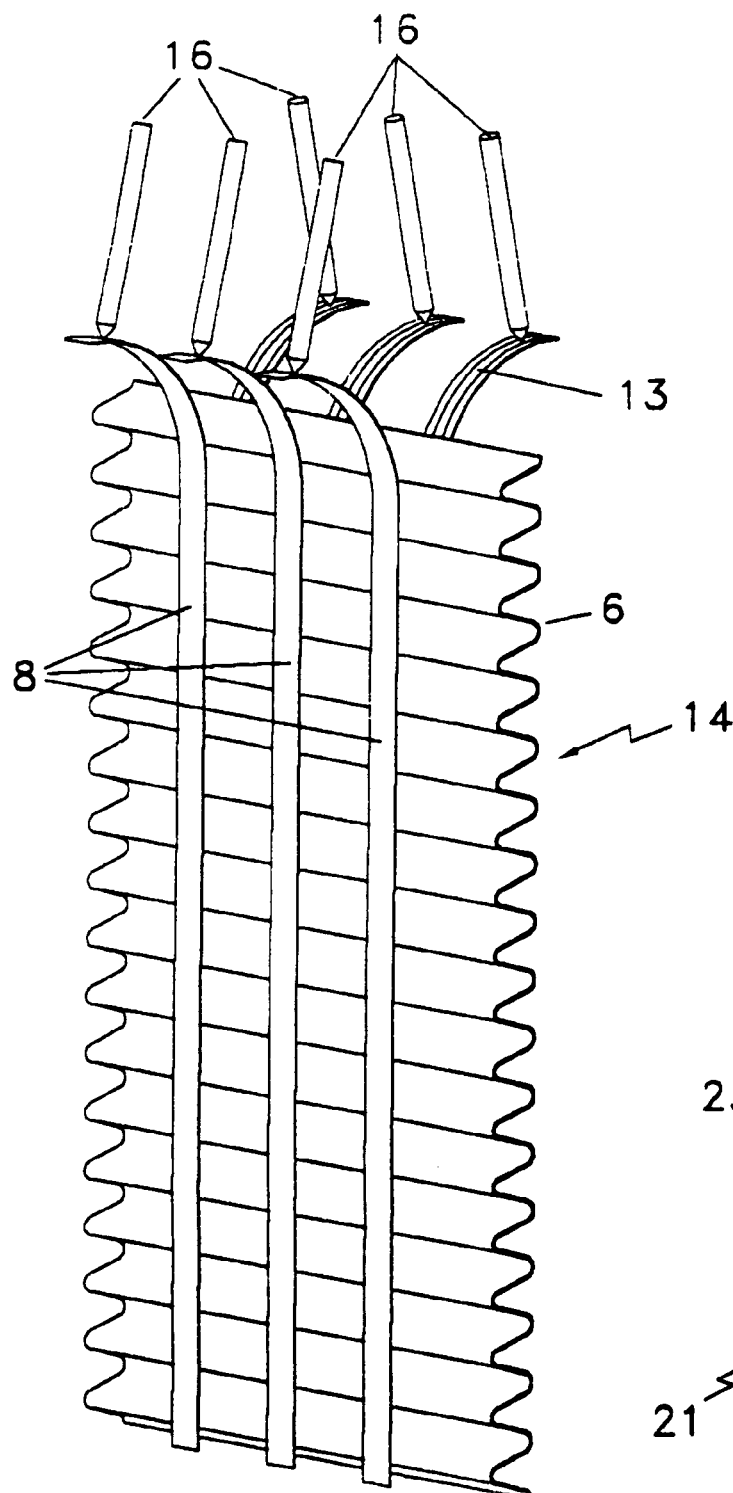
FIG. 2 schematically illustrates a portion of the unified novel filter assembly method wherein thin adhesive bands are applied to the inner faces of support strips as they enter a planar zone to extend transversely to and be fastened to the crests of the upstream and downstream crest sets of the folded, selected pleated filter media; and, FIG. 3 is an enlarged isometric, schematic view of a portion of a modified filter media assembly disclosing a further embodiment of the present invention wherein the crest forming pleat folds have been embossed to accommodate nesting adhesive band carrying support strips similar to those of FIG. 1.

In the unified and inventive method of the present invention and as can be seen in FIG. 2 of the drawings, pleated crest fibrous filter medium 6 is fed from a prior pleating zone—in one of several pleat manufacturing methods known in the prior art and not described herein—into and through a planar zone 14. Planar zone 14 can be vertically or horizontally disposed or can even be positioned at an inclined angle—depending upon other steps (not shown) of pleated filter assembly manufacture. As above discussed, the pleated fibrous filter material includes spaced upstream and downstream longitudinally extending spaced pleat crest sets 7.

Upstream planar zone 14, two sets each of three preselectively controlled breadth and thickness spaced support strips 8, along with pleated fibrous filter medium 6, are fed into planar zone 14 with the inner face of the opposed faces of each such support strip 8 receiving an adhesive fastening band 13, which also is of preselectively controlled breadth and thickness from one of three spaced adhesive applicators 16 of two spaced applicator sets so as to apply adhesive fastening bands 13 to the pleated crest sets of spaced strips 8 along the inner faces thereof thus serving to fasten the pleated fibrous filter medium 6 in stable position and maintaining the pleated crest sets of fibrous filter medium 6 in pleated form in passing through said planar zone and subsequently when assembled with a border frame body as part of unit filter frame assembly 2. It is to be noted that binding bands 13 are applied to the inner faces of the sets of support strips 8 intermediate and advantageously centrally to extend in longitudinal fashion thereon. It also is to be noted that the adhesive fastening bands 13 can be of a fast setting type with the breadth of bands and strips being respectively of measurements as aforedescribed.

Figure 3:
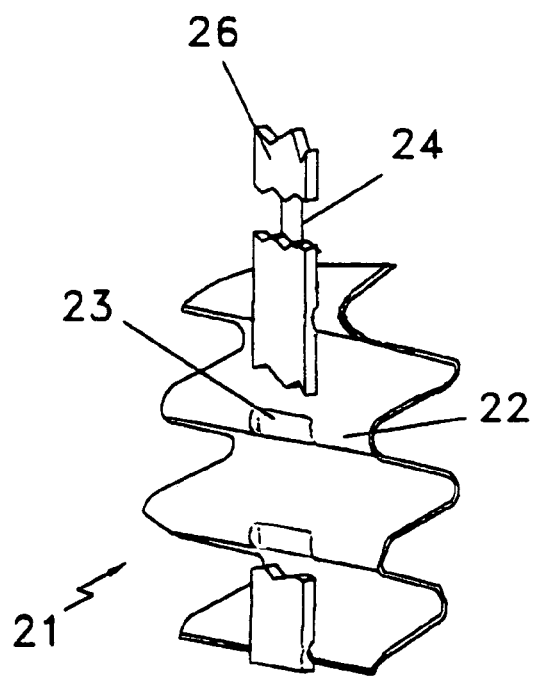

Referring to FIG. 3 of drawings, a modified embodiment of the present invention can be seen in an isomeric, schematic view of a portion of the filter media assembly. In this schematic view, the disclosed filter assembly portion 21 with sharp, narrow crests 22 are shown to include spaced embossed valleys 23 which extend along the longitudinal axis of each of the spaced crests 22, in spaced, aligned relation to accommodate crest support strips 24 comparable to aforedescribed support strips 8 and, like support strips 8, each strip can be of comparable material and properly fastened at opposed extremities to opposed sides of a border frame in a like manner.

Further each strip, like each strip 8, is arranged to include an adhesive fastening or binding band 26, like aforedescribed fastening band 13 so as to be nestingly fastened in the embossed valleys 23 in fast stable position with the nesting band 26 arrangement further insuring the stability of the filter assembly. Advantageously each of the embossed valleys can be of a depth of approximately zero point zero five (0.05) inch (") and a width of approximately zero point zero seven (0.07) inch (") with the bands sized accordingly for snug interfitting engagement.

The invention claimed is:

1. A fluid filter assembly including a filter frame member and a flow-through filter medium disposed therein comprising: a border frame member and a flow-through pleated crest filter medium sized to be disposed therein, said border frame member having an inner perimeter defining a flow-through passage to receive and support said filter medium, said filter medium being in the form of spaced pleated crests to provide spaced opposed upstream and downstream pleated crest sets; and, at least one longitudinally extending support strip of selected first support strength and preselectively controlled thickness and breadth to include spaced opposed side edges, said support strip extending adjacent at least one of said pleated crests of said filter medium in supporting relationship therewith, said support strip including a thin preselectively controlled thickness and breadth binding band of adhesive fastening material longitudinally extending the length of said support strip and having said breadth between said side edges of said support strip in primarily engaging and fastening relationship to said pleated crest of said pleated crest set, said support strip having a breadth of approximately zero point six two five (0.625) inch (") and said binding band having a breadth of zero point zero nine (0.09) inch (").

2. A fluid filter assembly including a filter frame member and a flow-through filter medium disposed therein comprising: a border frame member and a flow-through pleated crest filter medium sized to be disposed therein, said border frame member having an inner perimeter defining a flow-through passage to receive and support said filter medium, said filter medium being in the form of spaced pleated crests to provide spaced opposed upstream and downstream pleated crest sets; and, at least one longitudinally extending support strip of selected first support strength and preselectively controlled thickness and breadth to include spaced opposed side edges, said support strip extending adjacent at least one of said pleated crests of said filter medium in supporting relationship therewith, said support strip including a thin preselectively controlled thickness and breadth binding band of adhesive fastening material longitudinally extending the length of said support strip and having said breadth between said side edges of said support strip in primarily engaging and fastening relationship to said pleated crest of said pleated crest set, said filter medium material is dri-laid material having a composition by weight of approximately sixty-five (65) percent (%) three (3) denier polyester fiber and approximately thirty-five (35) percent (%) six (6) denier polyester fiber with a polyvinyl acetate binder comprising approximately forty (40) percent (%) of the fiber weight.

3. A fluid filter assembly including a filter frame member and a flow-through filter medium disposed therein comprising: a border frame member and a flow-through pleated crest filter medium sized to be disposed therein, said border frame member having an inner perimeter defining a flow-through passage to receive and support said filter medium, said filter medium being in the form of spaced pleated crests to provide spaced opposed upstream and downstream pleated crest sets; and, at least one longitudinally extending support strip of selected first support strength and preselectively controlled thickness and breadth to include spaced opposed side edges, said support strip extending adjacent at least one of said pleated crests of said filter medium in supporting relationship therewith, said support strip including a thin preselectively controlled thickness and breadth binding band of adhesive fastening material longitudinally extending the length of said support strip and having said breadth between said side edges of said support strip in primarily engaging and fastening relationship to said pleated crest of said pleated crest set, said filter medium material is dri-laid material having a composition by weight of approximately fifty (50) percent (%) four (4) denier bi-component fiber, approximately thirty-eight (38) percent (%) two point two five (2.25) denier polyester fiber and twelve (12) percent (%) fifteen (15) denier fiber.

4. A fluid filter assembly including a filter frame member and a flow-through filter medium disposed therein comprising: a border frame member and a flow-through pleated crest filter medium sized to be disposed therein, said border frame member having an inner perimeter defining a flow-through passage to receive and support said filter medium, said filter medium being in the form of spaced pleated crests to provide spaced opposed upstream and downstream pleated crest sets; and, at least one longitudinally extending support strip of selected first support strength and preselectively controlled thickness and breadth to include spaced opposed side edges, said support strip extending adjacent at least one of said pleated crests of said filter medium in supporting relationship therewith, said support strip including a thin preselectively controlled thickness and breadth binding band of adhesive fastening material longitudinally extending the length of said support strip and having said breadth between said side edges of said support strip in primarily engaging and fastening relationship to said pleated crest of said pleated crest set, said filter medium material is dri-laid material having a composition by weight of approximately sixty (60) percent (%) four (4) denier bi-component fiber, approximately twenty (20) percent (%) six (6) denier polyester fiber and twenty (20) percent (%) one (1) denier fiber.

5. A fluid filter assembly including a filter frame member and a flow-through filter medium disposed therein comprising: a border frame member and a flow-through pleated crest filter medium sized to be disposed therein, said border frame member having an inner perimeter defining a flow-through passage to receive and support said filter medium, said filter medium being in the form of spaced pleated crests to provide spaced opposed upstream and downstream pleated crest sets; and, at least one longitudinally extending support strip of selected first support strength and preselectively controlled thickness and breadth to include spaced opposed side edges, said support strip extending adjacent at least one of said pleated crests of said filter medium in supporting relationship therewith, said support strip including a thin preselectively controlled thickness and breadth binding band of adhesive fastening material longitudinally extending the length of said support strip and having said breadth between said side edges of said support strip in primarily engaging and fastening relationship to said pleated crest of said pleated crest set, said support strip extending transversely to said pleated crests with said pleated crests including selectively spaced embossed valleys sized to snuggly receive said support strip.

6. The fluid filter frame assembly of claim 5, said embossed valleys being aligned to receive said strip in embossing engagement therewith.

7. The fluid filter frame assembly of claim 6, said embossed valleys being of a depth of approximately zero point five (0.05) inch (") and a width of approximately zero point zero seven (0.07) inch (").

8. An air filter frame assembly comprising: a rectangular cardboard frame member formed from a selected pliable firm material to include spaced pairs of opposed frame member sides of U-shaped cross-section joined to provide an inner perimeter defining flow-through passage; a pleated crest fibrous polyester filter material sized to be disposed in said flow-through passage with opposed spaced ends there of adhesively engaging in fastened relation in said U-shaped frame member sides, said pleated fibrous crest filter material being by weight a composition selected from the group consisting of approximately sixty-five (65) percent (%) three (3) denier polyester fiber and approximately thirty-five (35) percent (%) six (6) denier polyester fiber; approximately fifty (50) percent (%) four (4) denier bi-component fiber, approximately thirty-eight (38) percent (%) two point two five (2.25) denier polyester fiber and twelve (12) percent (%) fifteen (15) denier fiber and; approximately sixty (60) percent (%) four (4) denier bi-component fiber, approximately twenty (20) percent (%) six (6) denier polyester fiber and twenty (20) percent (%) one (1) denier fiber, said pleat crests of said pleated fibrous material providing sets of spaced upstream and downstream spaced pleated crest sets with the fibers of said fibrous material being aligned and extending approximately transversely normal to said spaced pleated crests and in alignment with the direction of fluid stream flow through said defined flow-through passage, said fibers being further treated with an acetic acid vinegar odor removal, said spaced pleated crest being of three fourth (¾) inch (") normal depth with approximately fourteen (14) and twelve (12) spaced pleats per twelve (12) inches ("); and at least two spaced longitudinally extending pleated crest support strips of like material as said opposed border frame members, said support strips being of preselectively controlled thickness and breadth and extending transversely across at least one of said spaced pleated crest sets with opposed ends thereof fastened to said spaced opposed border frame members, each of said support strips including spaced opposed side edges and having a thin longitudinally extending binding bad of adhesive fastening material of preselectively controlled thickness and breadth and shape extending intermediate thereof to primarily engage in fastening relation with the pleated crests of said pleated crest set, each of said support strips being of a breadth of approximately zero point six two five (0.625) inch (") and each longitudinally extending binding band having a breadth of zero point zero nine (0.09) inch (").

\* \* \* \* \*